United States Patent
Wang et al.

(10) Patent No.: US 11,668,840 B2
(45) Date of Patent: Jun. 6, 2023

(54) ULTRA-LONG BASELINE RTK

(71) Applicant: QUALCOMM Incorporated, San Diego, CA (US)

(72) Inventors: Min Wang, Tustin, CA (US); Mangesh Chansarkar, Irvine, CA (US); Ning Luo, Cupertino, CA (US); Gengsheng Zhang, Cupertino, CA (US); David Tuck, San Juan Capistrano, CA (US); Bo Zheng, Sunnyvale, CA (US); Yinghua Yang, San Jose, CA (US); Han Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 16/998,612

(22) Filed: Aug. 20, 2020

(65) Prior Publication Data

US 2022/0057529 A1 Feb. 24, 2022

(51) Int. Cl.
  *G01S 19/41* (2010.01)
  *G01S 19/07* (2010.01)
  *G01S 19/44* (2010.01)

(52) U.S. Cl.
  CPC ............ *G01S 19/41* (2013.01); *G01S 19/071* (2019.08); *G01S 19/072* (2019.08); *G01S 19/44* (2013.01)

(58) Field of Classification Search
  CPC .......... G01S 19/41; G01S 19/72; G01S 19/71; G01S 19/44

(Continued)

(56) References Cited

U.S. PATENT DOCUMENTS 6,507,738 B1 1/2003 Allison et al.
2011/0025555 A1* 2/2011 Whitehead .............. G01S 19/41
  342/357.24

(Continued)

FOREIGN PATENT DOCUMENTS

WO WO 2020017307 1/2020

OTHER PUBLICATIONS

Gao W., et al., "A Method of GPS/BDS/GLONASS Combined RTK Positioning for Middle-Long Baseline with Partial Ambiguity Resolution", Survey Review, vol. 49, No. 354, May 4, 2017 (May 4, 2017), pp. 212-220, XP055855241, 10 Pages, ISSN: 0039-6265, DOI:10.1179/1752270615Y.0000000047 Retrieved from the Internet: URL:http://dx.doi.org/10.1179/1752270615Y.0000000047 equations (1). (2). (12)-(13) sections: Introduction, Observation model and ambiguity resolution model.

(Continued)

*Primary Examiner* — Bo Fan
(74) *Attorney, Agent, or Firm* — Qualcomm Incorporated

(57) ABSTRACT

A Real-Time Kinematic (RTK) solution is provided to mobile devices having multi-constellation, multi-frequency (MCMF) functionality, in which a single base station may have a baseline much farther than traditional base station. To enable this, embodiments account for differences in atmospheric effects between the rover station and base station when determining a GNSS position fix for a mobile device (rover station), allowing for a separate tropospheric delay error for a base station to be determined. Embodiments may use additional satellite measurements for which no RTK correction is available, and may further use orbital clock correction for these additional satellite measurements.

30 Claims, 11 Drawing Sheets

(58) Field of Classification Search
USPC .................................... 342/357.24, 357.69
See application file for complete search history.

(56) References Cited

U.S. PATENT DOCUMENTS

| | | | | |
|---|---|---|---|---|
| 2012/0050097 A1* | 3/2012 | Zhang | .................... | G01S 19/30 |
| | | | | 342/357.69 |
| 2017/0045624 A1* | 2/2017 | Drescher | ................ | G01S 19/44 |
| 2017/0307760 A1* | 10/2017 | Chen | ..................... | G01S 19/32 |
| 2018/0031711 A1* | 2/2018 | Cash | ..................... | G01S 19/41 |
| 2021/0318450 A1 | 10/2021 | Tomita et al. | | |

OTHER PUBLICATIONS

Partial International Search Report—PCT/US2021/042633—ISA/EPO—dated Nov. 11, 2021.
Takasu T., et al., "Kalman-Filter-Based Integer Ambiguity Resolution Strategy for Long-Baseline RTK with Ionosphere and Troposphere Estimation", GNSS 2010—Proceedings Of The 23rd International Technical Meeting of the Satellite Division of The Institute of Navigation (ION GNSS 2010), The Institute of Navigation, 8551 Rixlew Lane Suite 360 Manassas, VA 20109, USA, Sep. 24, 2010 (Sep. 24, 2010), pp. 161-171, XP056000181, 11 Pages, figures 1, 6 equations (3)-(9), tables 1, 3 sections, Introduction, Integer Ambiguity Resolution for Long Baseline RTK.
International Search Report and Written Opinion—PCT/US2021/042633—ISA/EPO—dated Mar. 16, 2022.
Shu B., et al., "Performance Analysis of BDS Medium-Long Baseline RTK Positioning Using an Empirical Troposphere Model", Sensors 2018, vol. 18, Issue. 4, pp. 1-17. DOI:10.3390/s18041199.
Tersus: "Centimeter Precision Positioning GNSS RTK Technology", 2019, 15 pages.

* cited by examiner

ULTRA-LONG BASELINE RTK

BACKGROUND

High-accuracy positioning can provide significant value to various modern-day applications for mobile devices. For example, not only is it helpful to have meter-level positioning to determine the lane of the road in which a vehicle is located for autonomous driving applications, it is further helpful to have sub-meter-level positioning to determine where, within the lane, the vehicle is located. Consumer-grade Global Navigation Satellite System (GNSS) receivers now offer quality carrier phase measurements, with multi-constellation, multi-frequency (MCMF) functionality. When used with Real-Time Kinematic (RTK) correction, these receivers can provide this type of high-accuracy positioning.

BRIEF SUMMARY

Techniques described herein leverage MCMF functionality to provide an ultra-long baseline RTK solution in which a single base station can cover a radius (or baseline) much farther than traditional methods (1000 miles or more). To enable this, embodiments can account for differences in atmospheric effects between the rover station and base station when determining a GNSS position fix for a mobile device (rover station), allowing for a separate tropospheric delay error for a base station to be determined. Embodiments may use additional satellite measurements for which no RTK correction is available, and may further use orbital clock correction for these additional satellite measurements.

An example method of RTK correction in GNSS positioning of a rover station, according to this description, comprises obtaining base station GNSS measurement information of one or more satellites from a base station, determining, at the rover station, rover station GNSS measurement information of the one or more satellites, and determining, at the rover station, one or more corrections based on the base station GNSS measurement information. The method further comprises obtaining, at the rover station, a tropospheric difference based on the base station GNSS measurement information and the rover station GNSS measurement information, and determining, at the rover station, a position of the rover station based on the rover station GNSS measurement information, the one or more corrections, and the tropospheric difference.

An example device, according to this description, comprises a memory and one or more processing units communicatively coupled with the memory and configured obtain base station GNSS measurement information of one or more satellites from a base station, determine rover station GNSS measurement information of the one or more satellites, and determine one or more corrections based on the base station GNSS measurement information. The one or more processing units are further configured to obtain a tropospheric difference based on the base station GNSS measurement information and the rover station GNSS measurement information, and determine a position of the rover station based on the rover station GNSS measurement information, the one or more corrections, and the tropospheric difference.

Another example device, according to this description, comprises means for obtaining base station GNSS measurement information of one or more satellites from a base station, means for determining, at the rover station, rover station GNSS measurement information of the one or more satellites, means for determining, at the rover station, one or more corrections based on the base station GNSS measurement information. The device further comprises means for obtaining, at the rover station, a tropospheric difference based on the base station GNSS measurement information and the rover station GNSS measurement information, and means for determining, at the rover station, a position of the rover station based on the rover station GNSS measurement information, the one or more corrections, and the tropospheric difference.

An example non-transitory computer-readable medium, according to this description, has instructions stored therewith four Real-Time Kinematic (RTK) correction in GNSS positioning of a rover station. The instructions, when executed by one or more processing units, cause the one or more processing units to obtain base station GNSS measurement information of one or more satellites from a base station, determine rover station GNSS measurement information of the one or more satellites, and determine one or more corrections based on the base station GNSS measurement information. The instructions, when executed by one or more processing units, further cause the one or more processing units to obtain a tropospheric difference based on the base station GNSS measurement information and the rover station GNSS measurement information, and determine a position of the rover station based on the rover station GNSS measurement information, the one or more corrections, and the tropospheric difference.

Figure 1:
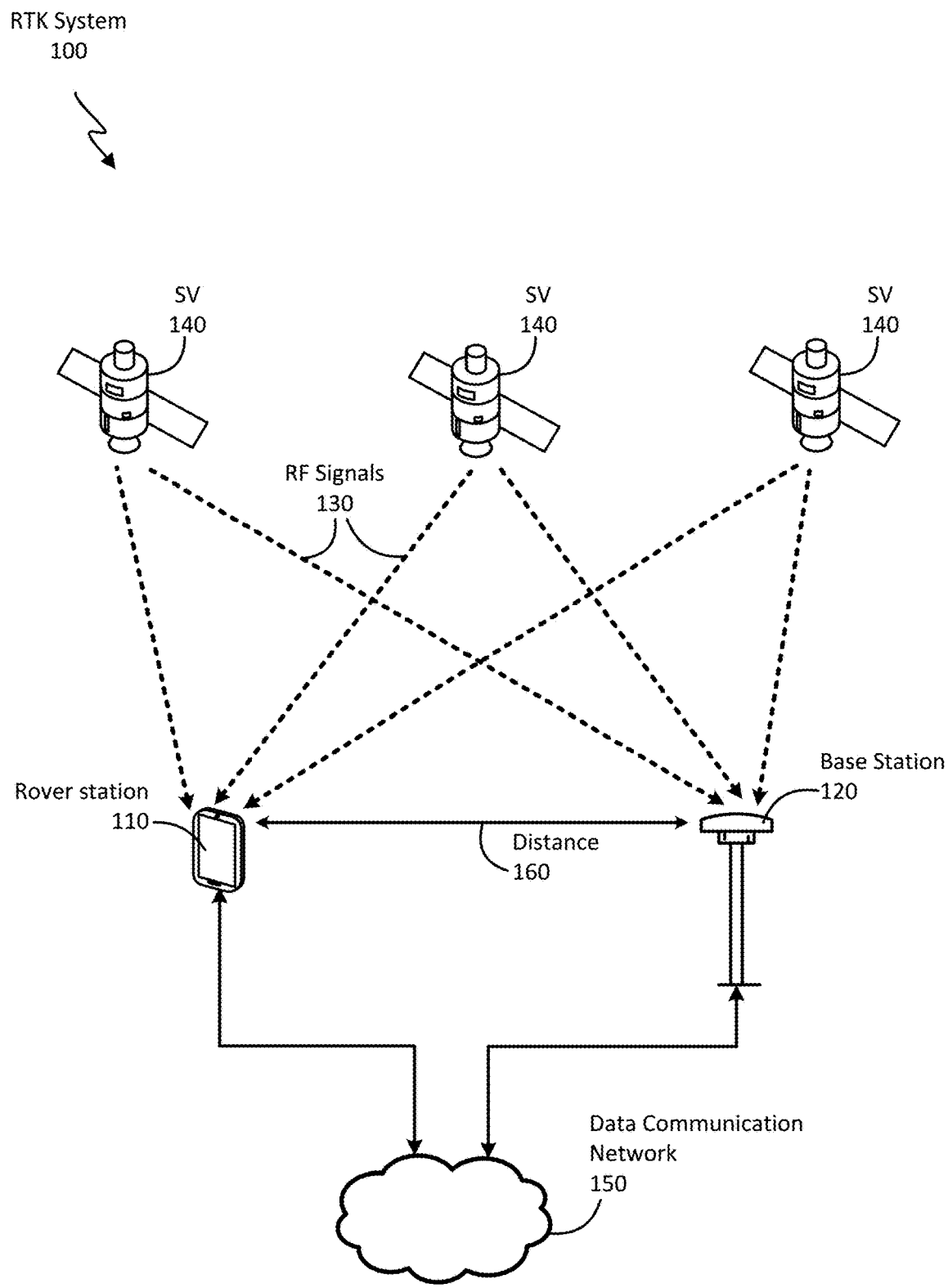
FIG. 1 is a simplified diagram of an RTK system 100, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As noted, consumer-grade GNSS receivers now offer quality carrier phase measurements, with MCMF functionality capable of high-accuracy positioning. That said, current solutions for providing sub-meter accuracy have their shortcomings. Precise Point Positioning (PPP), for example, uses a network of global base stations to determine GNSS satellite orbit and clock corrections and transmit them to a "rover station" (e.g., a mobile device). But the network can be expensive to develop and maintain. Accordingly, PPP providers typically charge a fee for access to these corrections. Furthermore, PPP has several limitations, such as tight modeling of all errors, which can require significant complexity, maintenance, and control. Also, adding a new constellation to PPP can be slow and expensive. PPP performance significantly relies on the accuracy of the determined orbit and clock corrections, and during events like satellite orbit eclipse, orbit correction accuracy will generally degrade, which may cause issues with PPP performance.

RTK is an alternative to PPP. RTK corrections are a GNSS-based positioning technique that uses carrier-based ranging by determining the number of carrier cycles between a satellite and rover station. Various errors (e.g., satellite clock and orbit, ionospheric and tropospheric delays, phase wind-up, site displacement including solid earth tide, ocean loading, and pole tide) can be neglected if differencing observations with a "base station" (a station having a known location), assuming the observations have effectively the same errors. However, because differences in atmospheric errors between the base station and rover station—primarily tropospheric effects—increase with distance between the two, current ranges are limited. Thus, to provide RTK corrections for the whole United States would require a massive, expensive network of base stations.

Embodiments provided herein address these and other issues by accounting for differences in atmospheric effects between the rover station and base station when determining a GNSS position fix (also referred to herein as a "location determination") for the rover station. In particular, embodiments allow for a separate tropospheric delay error for the base station to be determined, significantly increasing the range of which RTK data from a base station can be used. As opposed to traditional RTK solutions, embodiments allow for the creation of network RTK having significantly fewer base stations. And unlike PPP, embodiments can quickly add new constellations as they are available and immediately use all dual-frequency combinations currently available.

FIG. 1 is a simplified diagram of an RTK system 100, according to an embodiment. Put generally, the RTK system 100 enables a highly accurate GNSS position fix of the rover station 110 using GNSS receivers at both the rover station 110 and base station 120 receive RF signals 130 from satellite vehicles (SVs) 140 from one or more GNSS constellations (e.g., Global Position System (GPS), Galileo (GAL), etc.). The types of rover stations 110 used may vary, depending on application. In some embodiments, for instance, the rover station 110 may comprise consumer electronics or devices, such as a mobile phone, tablet, laptop, wearable device, vehicle, or the like. In some embodiments, the rover station 110 may comprise industrial equipment, such as survey equipment.

It can be further noted that, although the embodiment illustrated in FIG. 1 and additional embodiments described herein show the use of only a single base station 120, alternative embodiments may employ more than one base station 120. That is, according to some embodiments, the rover station 110 may employ RTK correction information from a plurality of base stations 120, individually and/or collectively. As such, it will be understood that references to "a base station" in the description of the embodiments herein may refer to one base station of a plurality of base stations.

To perform a traditional GNSS position fix, the rover station 110 can use code-based positioning to determine a distance of each of the SVs 140 based on a determined delay in a generated pseudorandom binary sequence received in the RF signals 130. The rover station 110 can further accurately calculate the location of each SV 140 at a specific moment in time using ephemeris (or navigation) data regarding the SVs 140. With the distance and location information of the SVs 140, the rover station 110 can then determine a position fix for its location. This position fix may be determined, for example, by a Standalone Positioning Engine (SPE) executed by one or more processors of the rover station 110. However, the resulting accuracy of the position fix for the rover station 110 is subject to errors caused by SV 140 orbit and clock, ionosphere and troposphere delays, and other phenomena. Although this can provide accuracy on the order of meters, this accuracy may be insufficient for many applications.

As noted, traditional RTK can provide enhanced accuracy (e.g., on the order of centimeters or decimeters) by using carrier-based ranging based on the carrier wave of the RF signals 130 and using the base station 120 to help reduce errors from various error sources. The base station 120 comprises a fixed GNSS receiver that, using carrier-based ranging and known position, obtains measurements of SVs 140 that can be sent to the rover station 110 via, for example, a data communication network 150. The rover station 110 can then use these base station GNSS measurements (referred to herein as "RTK correction information" or "base station GNSS measurement information") by comparing the measurements with measurements of the SVs 140 made by the rover station 110 to reduce the errors as described above (e.g., orbit and clock errors, ionosphere and troposphere delays, etc.) and provide a position fix. This position fix may be determined, for example, by a Precise Positioning Engine (PPE) executed by one or more processors of the rover station 110. More specifically, in addition to the information provided to and SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and PPP.

The RTK correction information is only valid, however, within a threshold distance 160. That is, the RTK correction information assumes similar errors (e.g., atmospheric errors) between base station 120 and rover station 110, based on the rover station 110 being within a threshold distance 160, or "baseline," from the base station 120. However, because spatial decorrelation in the errors increases over distance 160 (e.g., because RF signals 130 pass through different portions of the atmosphere when traveling to the base station 120 then to the rover station 110), this distance 160 is limited for traditional RTK. For traditional RTK systems having a single base station, this distance 160 is 10-20 km. For network RTK having multiple base stations (and thus multiple data points), this distance 160 can be extended to 40-50 km. Beyond this distance, the integer ambiguity of the carrier phase may not be resolvable for the rover station 110. And thus, the RTK correction information at such distances may have limited or no use in a position fix of the rover station 110.

Figure 2:
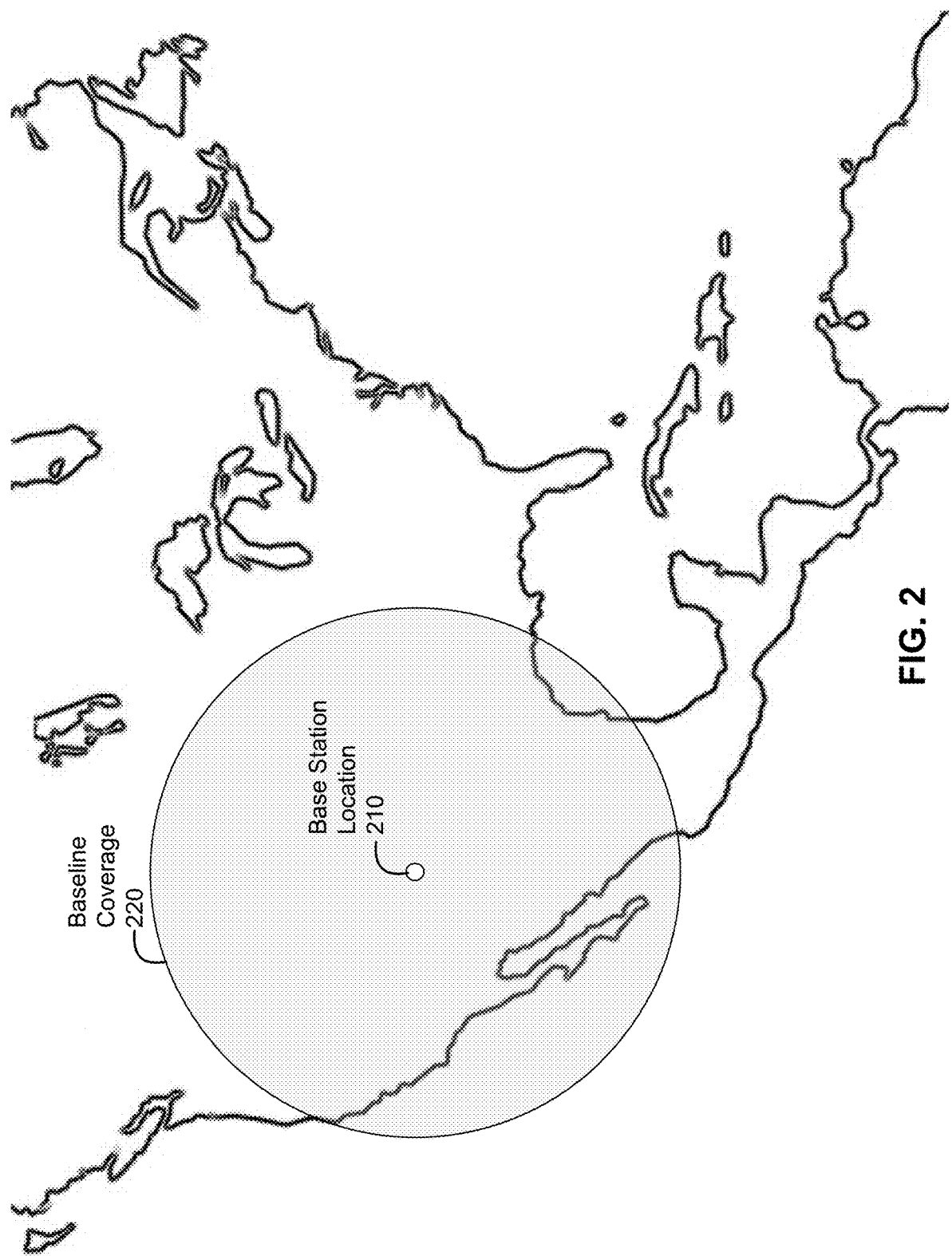
FIG. 2 is a map illustrating possible baseline coverage of a single base station, according to an embodiment.

According to embodiments provided herein, this distance 160 can be significantly extended for a given RTK system 100 (e.g., up to 1000 miles or more) by leveraging MCMF functionality of a GNSS receiver at the rover station 110 and compensating for atmospheric differences between the rover station 110 and base station 120. As shown in FIG. 2, for example, a single base station 120 located at a base station location 210 could provide an area of baseline coverage 220 capable of providing accurate RTK correction information for rover stations located in a majority of the United States. A few base stations 120 could then provide coverage for all of North America. As such, this could provide significant savings in establishing a network of base stations 120 to provide RTK correction information, versus a traditional network RTK approach.

Referring again to FIG. 1, to significantly extend distance 160, embodiments can provide error correction for SV orbit and clock, as well as ionosphere and troposphere delays. According to embodiments, traditional RTK techniques for accounting for SV orbit and clock error may be utilized.

Additionally, ionosphere errors can be reduced using the ionosphere cancellation functionality of an MCMF GNSS receiver at the rover station 110. To do so, the MCMF GNSS receiver can receive RF signals 130 transmitted on different frequencies (e.g., GPS L1 and L5 frequencies, GAL E1 and E5A frequencies, etc.) and utilize existing solutions to account for differences in ionospheric delay between base station 120 and rover station 110.

Errors stemming from the spatial decorrelation of tropospheric delay between measurements at the base station 120 and rover station 110 (which are typically negligible in instances where the distance 160 is short) can be accounted for by determining a difference in tropospheric delay at the base station 120 and rover station 110.

Ultimately, error correction can be provided as illustrated in the following equation for the carrier phase difference between the rover station 110 and base station 120, for a given SV (j):

$$\Delta\varphi_{b,r}^j = \Delta\rho_{b,r}^j + \Delta dT_{b,r}^j + \Delta d\text{Orb}_{b,r}^j + \Delta d\text{Trop}_{b,r}^j + \Delta N_{b,r}^j + \Delta\epsilon_{b,r}^j, \quad (1)$$

which can be further reduced as follows:

$$= \Delta\rho_{b,r}^j + \Delta dT_{b,r}^j + \Delta d\text{Orb}_{b,r}^j + (d\text{Trop}_r^j - d\text{Trop}_b^j) + \Delta N_{b,r}^j + \Delta\epsilon_{b,r}^j \quad (2)$$

$$= \Delta\rho_{b,r}^j + \Delta dT_{b,r}^j + \Delta d\text{Orb}_{b,r}^j + (\text{Map}_r^j * dWZ_r - \text{Map}_b^j * dWZ_b) + \Delta N_{b,r}^j + \Delta\epsilon_{b,r}^j. \quad (3)$$

Here, the annotation b, r, and j, refer to base station 120, rover station 110, and a given SV (j), respectively. Equation variables are defined as follows:

$\Delta\varphi_{b,r}^j$—Carrier phase difference between base and rover Single Differenced (SD) carrier phase for satellite j
$\Delta\rho_{b,r}^j$—SD geometry
$\Delta dT_{b,r}^j$—SD receiver clock
$\Delta d\text{Orb}_{b,r}^j$—SD orbit error
$\Delta d\text{Trop}_{b,r}^j$—SD troposphere error
Map—Troposphere mapping function
dWZ—Troposphere wet zenith delay residual
$\Delta N_{b,r}^j$—SD ambiguity
$\Delta\epsilon_{b,r}^j$—SD noise and multipath As shown, equations (1)-(3) above account for errors from non-tropospheric sources, such as geometry (orbit), clock, and so forth. (As previously noted, because MCMF GNSS receivers can eliminate ionospheric error, and thus such error may not need to be accounted for in these equations.) These equations also provide for special handling of the tropospheric error. In particular, the term $\text{Map}_r^j * dWZ_r - \text{Map}*dWZ_b$ of equation (3) accounts for the difference in delays due to tropospheric error at the rover station 110 ($\text{Map}_r^j * dWZ_r$) and at the base station 120 ($\text{Map}_b^j * dWZ_b$), rather than a single tropospheric error at the base station 120.

The Map variable used to determine tropospheric error can be based on any of a variety of tropospheric models. These tropospheric models are used to determine tropospheric delay based on the line-of-sight path of the signal between the given satellite and the rover station 110 or base station 120 (to determine respective tropospheric delays at the rover station 110 or base station 120). More specifically, the models are used to determine how wet and dry components of the troposphere delay signals transmitted along the line-of-sight path, given a time of year and time of day. Depending on desired functionality, any of a variety of tropospheric models may be used, including Hopfield, Radio Technical Commission for Aeronautics (RTCA), Saastamoinen, and the like. Of particular note in equation (3) is the accounting for a difference in the tropospheric wet zenith delay residual at the base station 120 from that at the rover station 110. (If left unaccounted for, this difference can cause noticeable error in the accuracy of the GNSS position fix of the rover station 110 in instances where the distance 160 exceeds those of traditional RTK (e.g., 10-20 km).)

The line of sight path between the given satellite and the rover station 110 or base station can be determined based on the current locations of the respective entities. The current location of the of the given satellite can be determined, for example, using timing and orbital/geometry information for the satellite. The location of the base station 120 is fixed and may be stored in memory at the rover station 110 and/or sent from the base station 120 to the rover station 110 along with the base station GNSS measurement information. The approximate location of the rover station 110 can be determined in any of a variety of ways, including based on the previous location determination (and possibly movement information from sensors, i.e., dead reckoning), code-based GNSS positioning, network-based positioning (e.g., Enhanced Cell Identity (ECID), Observed Time Difference Of Arrival (OTDOA)), or the like.

Figure 5:
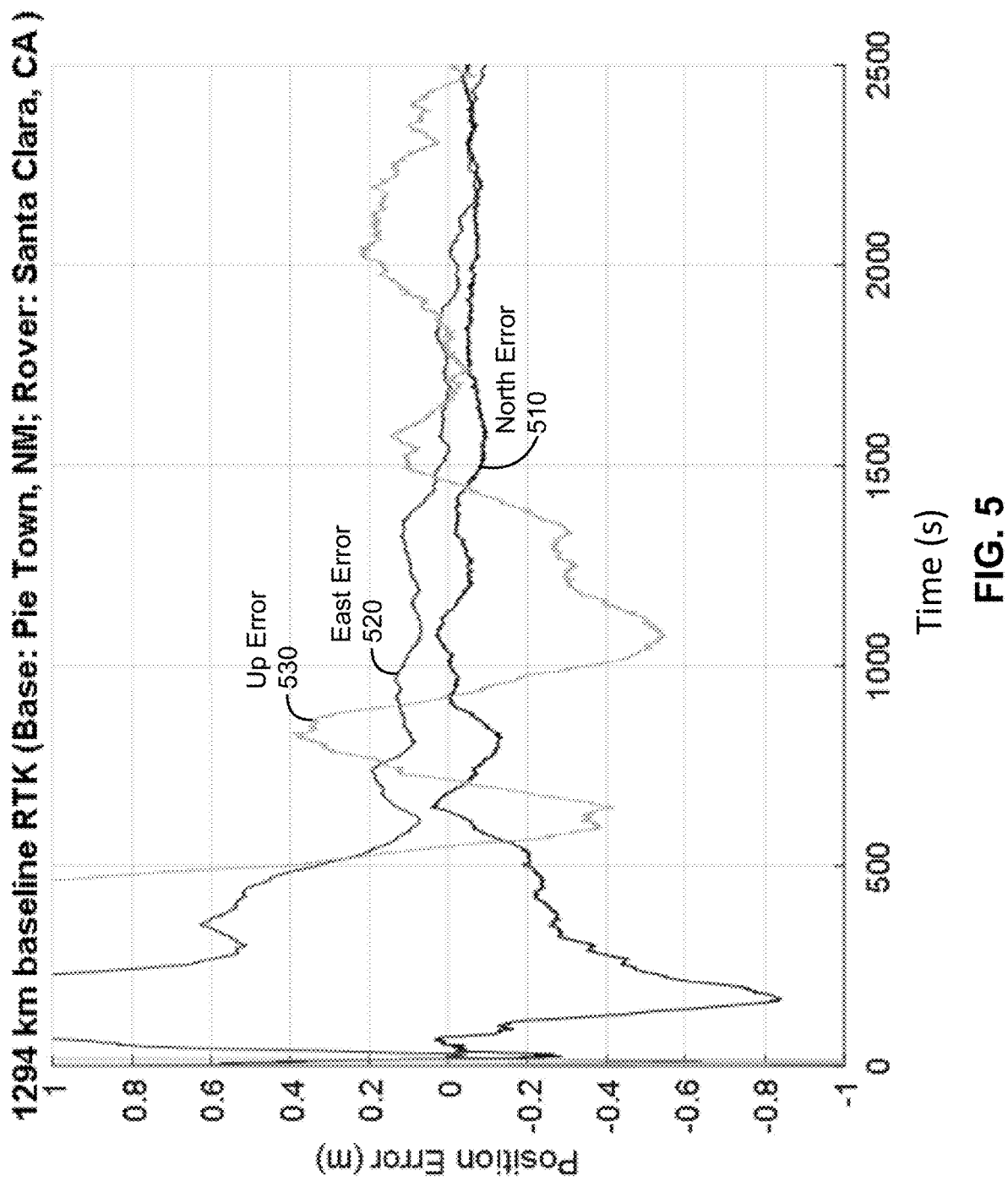
FIGS. 5 and 6 are graphs illustrating position error results, according to an embodiment of the techniques described herein.
Figure 6:
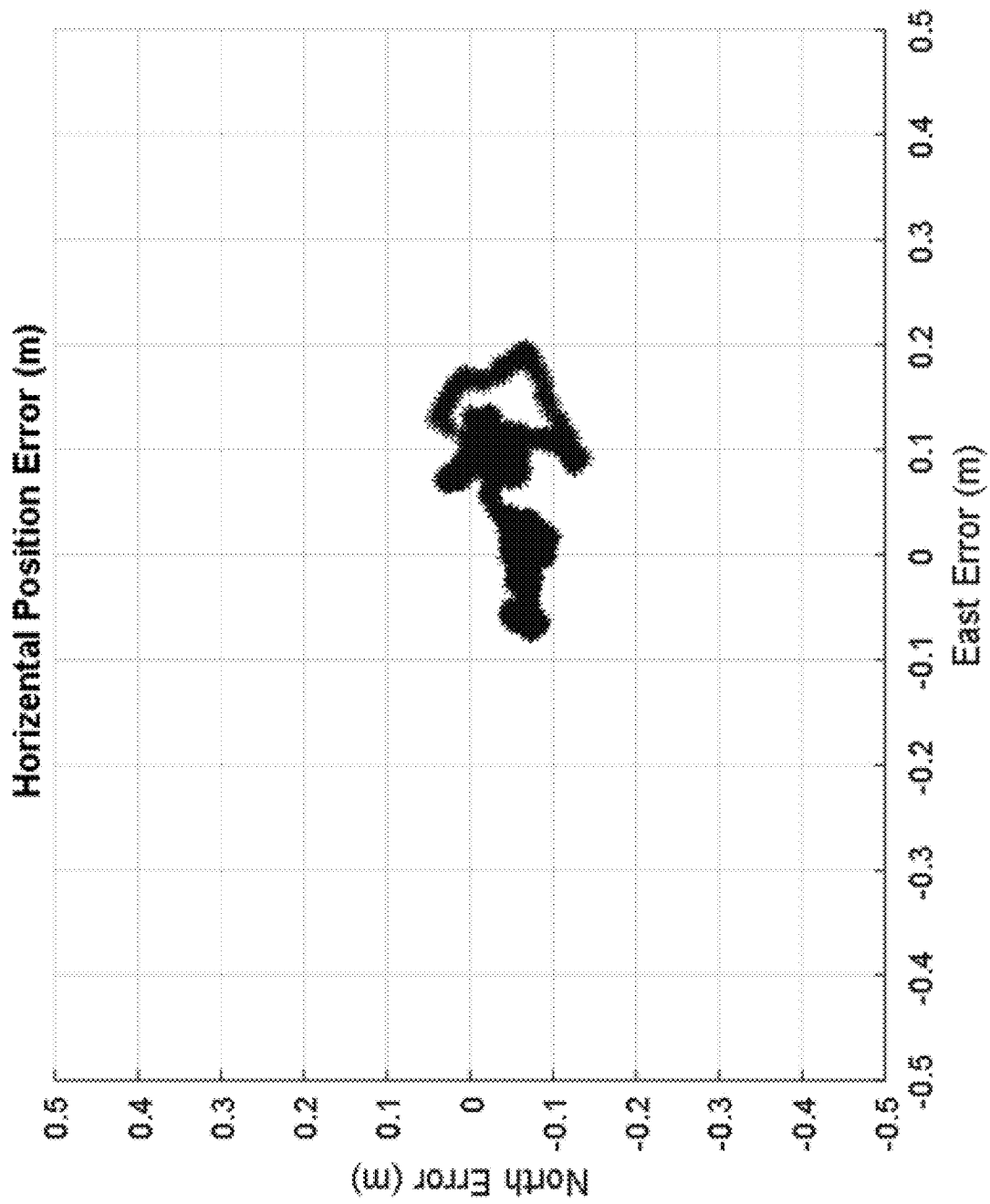

Ultimately, accounting for tropospheric error in this manner, for each SV 140 from which RF signals 130 are detected by both base station 120 and rover station 110, can increase the accuracy of an RTK-enhanced GNSS position fix of the rover station 110 sufficiently to make additional applications possible. Whereas failing to account for tropospheric error in this manner may result in position fixes on the order of tens of centimeters to a meter, accounting for tropospheric error in this manner may result in a position fix on the order of 10 centimeters or less. Additional details regarding preliminary results of embodiments using this method are shown in FIGS. 5 and 6, which are described in more detail below.

Because of the baseline distance 160 provided by embodiments described herein may be significantly longer than traditional RTK solutions, the rover station 110 may observe (e.g., detect RF signals 130 from) a large number of SVs 140 that are not also observed by the base station 120. As such, RTK correction information may not be applicable to such SVs 140. However, according to some embodiments, some correction can be made regarding RF signals 130 received by these SVs 140.

Figure 3:
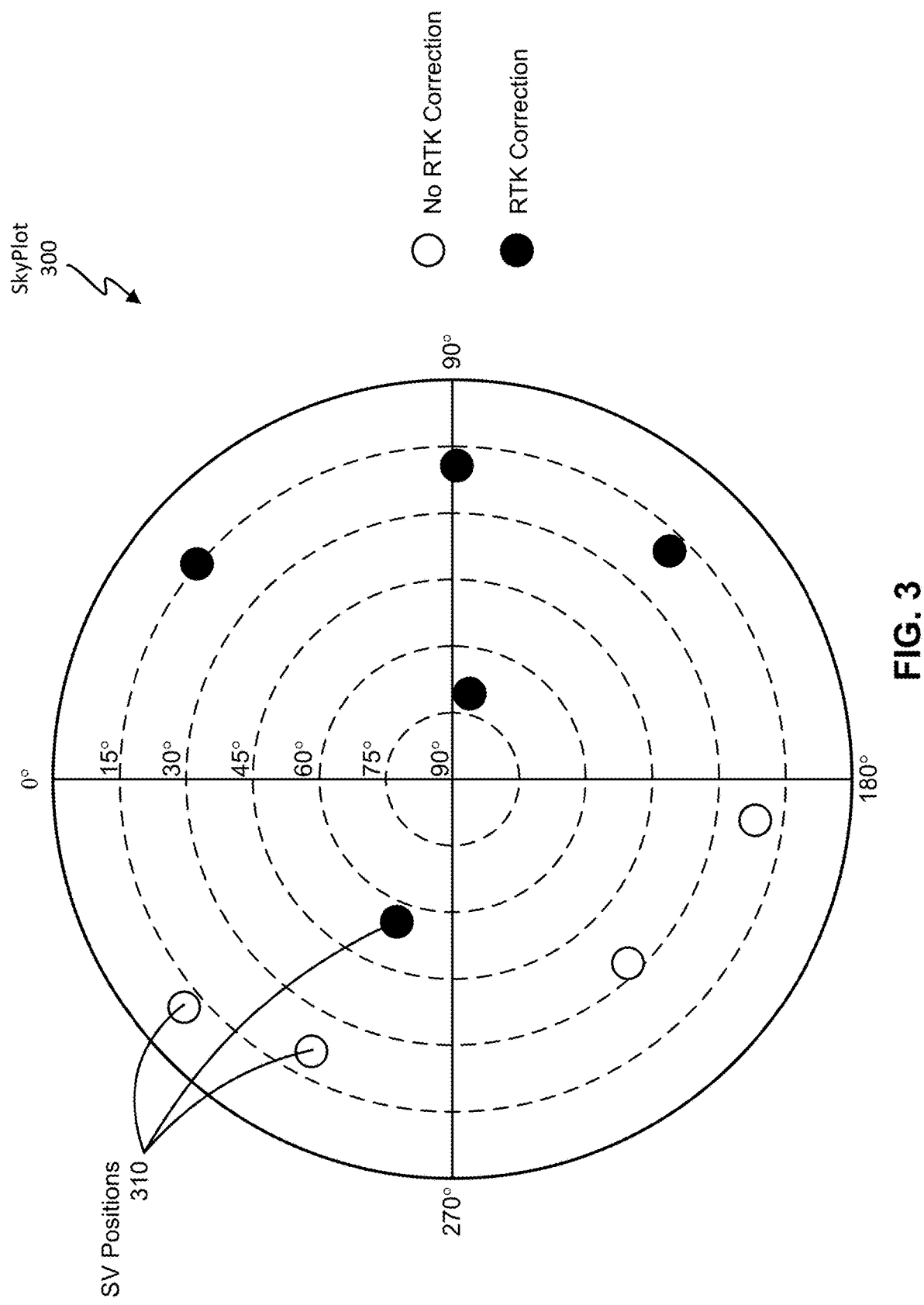
FIG. 3 is an illustration of a SkyPlot, showing the space vehicle (SV) positions of SVs detected by the rover station, in an example.

As an example, FIG. 3 is an illustration of a SkyPlot 300, showing the SV positions 310 (azimuth and elevation) of each SV 140 detected by the rover station 110. (To avoid clutter, only a few SV positions 310 are labeled.) SV positions 310 labeled with "RTK Correction" (solid black circles) correspond to SVs 140 detected by a base station 120. Thus, for such SVs 140, the rover station 110 can receive RTK correction information and apply RTK correction (e.g., as shown in the above equations) to measurements of RF signals 130 received from such SVs 140. On the other hand, SV positions 310 labeled with "No RTK Correction" (white circles with black outline) correspond to SVs 140 that are not detected by the base station 120. Even so, Space-Based Augmentation System (SBAS) or equivalent correction can still be used, if available, to correct orbital clock error related to RF signals 130 received from these SVs 140. This can further enhance accuracy of a GNSS position fix for the rover station 110.

In the example illustrated in FIG. 3, for instance, RTK correction can be applied to improve measurements of five of the nine visible SVs 140 to enhance the accuracy of the GNSS position fix for the rover station 110. This accuracy can be further enhanced by applying correction from a correction service such as SBAS or Wide Area Augmentation System (WAAS) to measurements of the remaining four SVs 140. Although SBAS is currently limited to GPS L1, similar corrective data may be available on different frequencies and/or different GNSS constellations.

Figure 4:
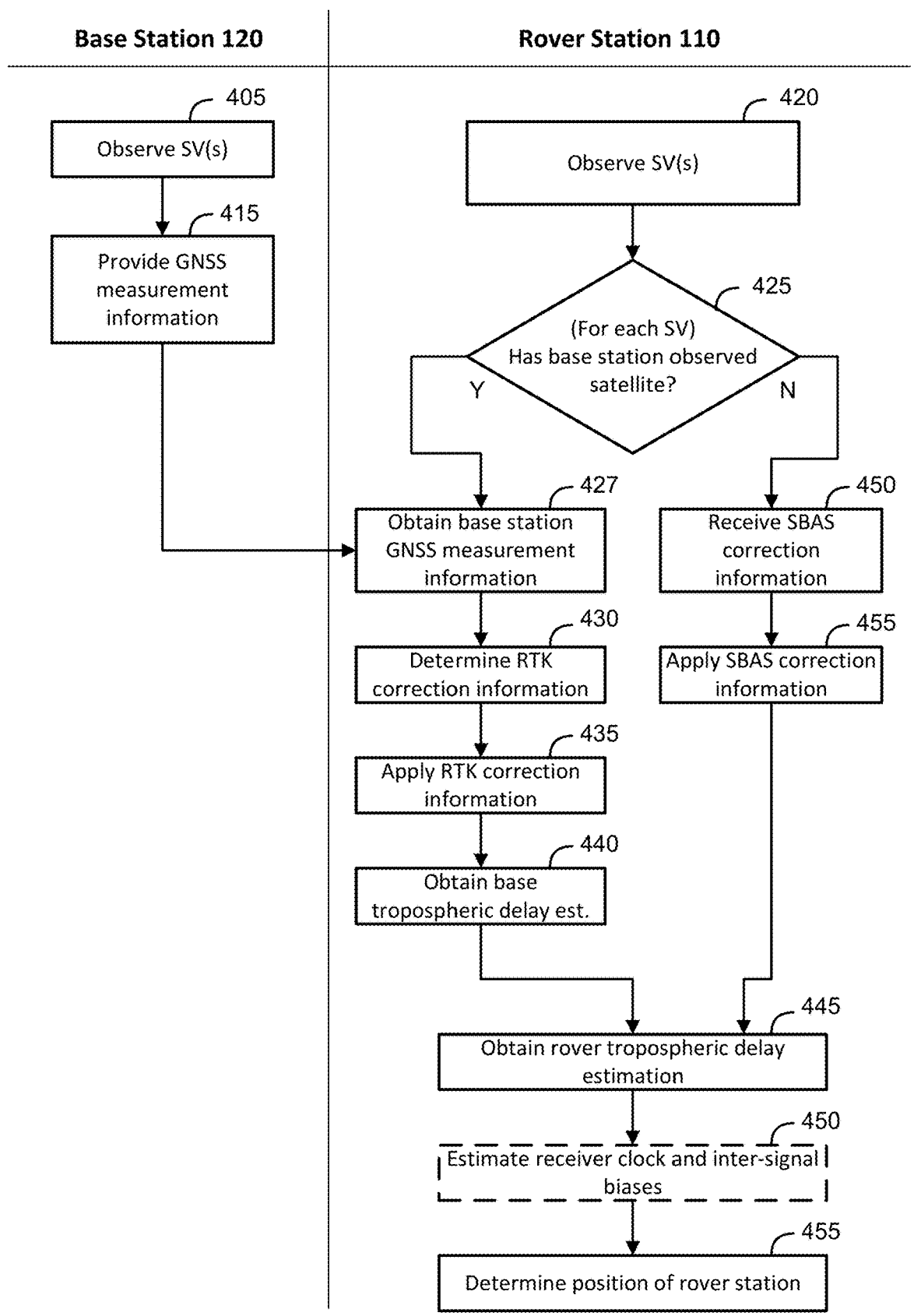
FIG. 4 is a swim-lane diagram of an embodiment of a method of enhanced GNSS location determination of a rover station in which RTK and other correction, as described herein, may be applied.

FIG. 4 is a swim-lane diagram of an embodiment of a method of enhanced GNSS location determination of a rover station 110 in which RTK and correction from SBAS (or a similar correction service), as described above, may be applied. As with other figures provided herein, FIG. 4 is provided as a non-limiting example. As such, it will be understood that certain variations to the method illustrated may be made in alternative embodiments. Such variations may include performing the functionality described in the various blocks illustrated in FIG. 4 in a different order, adding and/or removing certain functions, and the like. Moreover, although various functions are ascribed to either a rover station 110 or a base station 120, it will be understood that some functions may be performed by one or more separate devices (e.g., computers) local to or remote from the base station 120 and/or over station 110.

At block 405, the base station 120 observes one or more SVs 140. As previously discussed, such an observation may comprise conducting carrier-based RTK range measurements using the carrier wave of RF signals 130 of each of the observed SVs 140, in the manner described above. At block 415, this GNSS measurement information can be provided to the rover station 110 and used for RTK correction. Because the distance 160 between the rover station 110 and a base station 120 may be significant (e.g., tens, hundreds, or even thousands of kilometers), the base station 120 may send this information to the rover station 110 via a data communication network 150 rather than via direct wireless means. As such, the data communication network 150 may comprise a Wide Area Network (WAN), which may include one or more public and/or private data communication networks (including the Internet), and may utilize any variety of wired and/or wireless communication technologies. In some embodiments, the RTK correction information may be responsive to a request for such information (not shown in FIG. 4) sent from the rover station 110, and may therefore include RTK correction information for SVs identified in the request.

The functionality at the rover station 110 also includes, at block 420, observing SVs. Again, the rover station 110 may comprise an MCMF GNSS receiver capable of providing carrier-based ranging, and therefore being able to make use of corrective data provided in carrier phase difference information (e.g., as provided in equations (1)-(3)). Moreover, such MCMF GNSS receivers can also provide ionosphere-free measurements using multiple frequencies, thereby being able to cancel out errors due to ionosphere delays.

At block 425, the rover station 110 can then determine, for each observed SV, whether the base station 120 has observed the respective SV as well. (Accordingly, the rover station 110 may receive a prior indication (not shown) from the base station 120 of SVs observed at block 405.) If a particular SV is determined to be commonly observed by both the base station 120 and rover station 110, the rover station 110 can then proceed to block 427, where it receives base station GNSS measurement information for the particular SV. In such instances, the rover station 110 can then determine the RTK correction information at block 430 in the manner described above. The rover station 110 can then apply the RTK correction information at block 435.

To further account for differences in tropospheric delays between the base station 120 and rover station 110, the rover station may further obtain tropospheric delay information for both the base station 120 and rover station 110 at blocks 440 and 445, respectively. As noted, this tropospheric delay information may be estimated for a line-of-sight signal received at the base station 120 or rover station 110 from the respective SV 140, determined using any of a variety of tropospheric delay models.

Returning to block 425, if the base station 120 has not observed a satellite that was observed by the rover station 110 at block 420, the rover station 110 can then receive SBAS correction information at block 450 and apply the SBAS correction information at 455. In alternative embodiments, additional or alternative correction information from correction services other than SBAS may be used. In such instances, the tropospheric delay at the rover station 110 may still be obtained, as shown by block 445.

According to some embodiments, the functionality at block 450 may be implemented, in which receiver clock and inter-signal biases are estimated. This can help simplify blended use of both RTK-corrected and SBAS-corrected SV information, in contrast to the selection of a reference SV (as is used in traditional RTK correction).

According to traditional RTK correction techniques, the rover station 110 may select a reference SV (often the SV 140 having the highest elevation angle) from which a double difference (DD) calculation may be performed to cancel out clock offsets. This, however, not only requires the observation of a plurality of SVs, but can also complicate the use of information from SVs from which no RTK correction information is available (e.g., the SVs for which SBAS correction is applied at 455).

In contrast, the estimation of receiver clock and inter-signal biases at block 450 can allow embodiments to sidestep these complications. In RTK, while no reference satellite is selected, i.e., no between satellite differencing is applied to measurements, receiver clock and inter-signal biases will become observable and be estimated through navigation filter. Inter-signal bias may arise from clock offsets between different GNSS constellations (e.g., GPS and GAL), different group delays between different frequencies (e.g., GPS frequencies L1 and L5), and/or path delays in the GNSS receiver from antenna to correlators for the different frequencies.

At block 455, the position of the rover station 110 can then be determined. This can be done, for example, by a PPE (or equivalent) of the rover station 110. Tropospheric delay for a given SV can be accounted for differently by the PPE, depending on whether RTK information was provided. That is, for an SV for which tropospheric delay was determined for the base station 120 at block 440, the difference in tropospheric delay at the base station 120 and at the rover station 110 (obtained at block 445) can be accounted for (e.g., using equation (3) above). Alternatively, where no RTK information was provided, tropospheric delay information for the rover station 110 (obtained at block 445) may be accounted for. For observed SV(s), correction can then be applied to carrier-based ranging measurements of signals from the SV taken at the rover station 110, and the position of the rover station 110 can be determined from the ranging in the manner previously described with respect to RTK.

FIGS. 5-6 are graphs relating to simulated results for GNSS position determinations using RTK information in the manner described above in relation to FIGS. 1-4. As indicated in FIG. 5, simulation results are taken from a simulation where a base station is located in Pie Town, N. Mex., and a rover station is located in the Santa Clara, Calif. (The distance between the base and rover stations is approximately 1294 km.)

FIG. 5 is a graph illustrating position error (in meters) over time (in seconds) in the East-North-Up (ENU) coordinate system. In particular, north (latitudinal) error 510, east (longitudinal) error 520, and up (vertical) error 530 are plotted. In this simulation, seven GPS satellites and seven GAL satellites reviewable from both the rover station and base station. Plotted positional error was calculated using survey truth. As shown, total horizontal error (east error 520 and north error 510) was reduced to and remained under 20 cm after roughly 10 minutes (600 seconds). Horizontal error after 10 minutes (for seconds 600 to 2500) for the simulation is additionally plotted on the graph shown in FIG. 6. In contrast, standalone GPS has a horizontal error of approximately 4 m, which can be reduced to 2 m using SBAS correction. Accordingly, embodiments utilizing the RTK correction as provided herein can provide for significantly higher accuracy over long range.

In some embodiments, a connected device may intervene between a base station 120 rover station 110. This can allow the connected device 710 to assume some of the processing requirements for determining RTK correction and/or communicate with multiple rover stations 110. Accordingly, this can reduce processing and/or conductivity requirements of rover stations 110 for RTK correction and/or bandwidth requirements for communicating measurements of a base station 120. The functionality of an example embodiment of such a connected device is illustrated in FIGS. 7 and 8.

Figure 7:
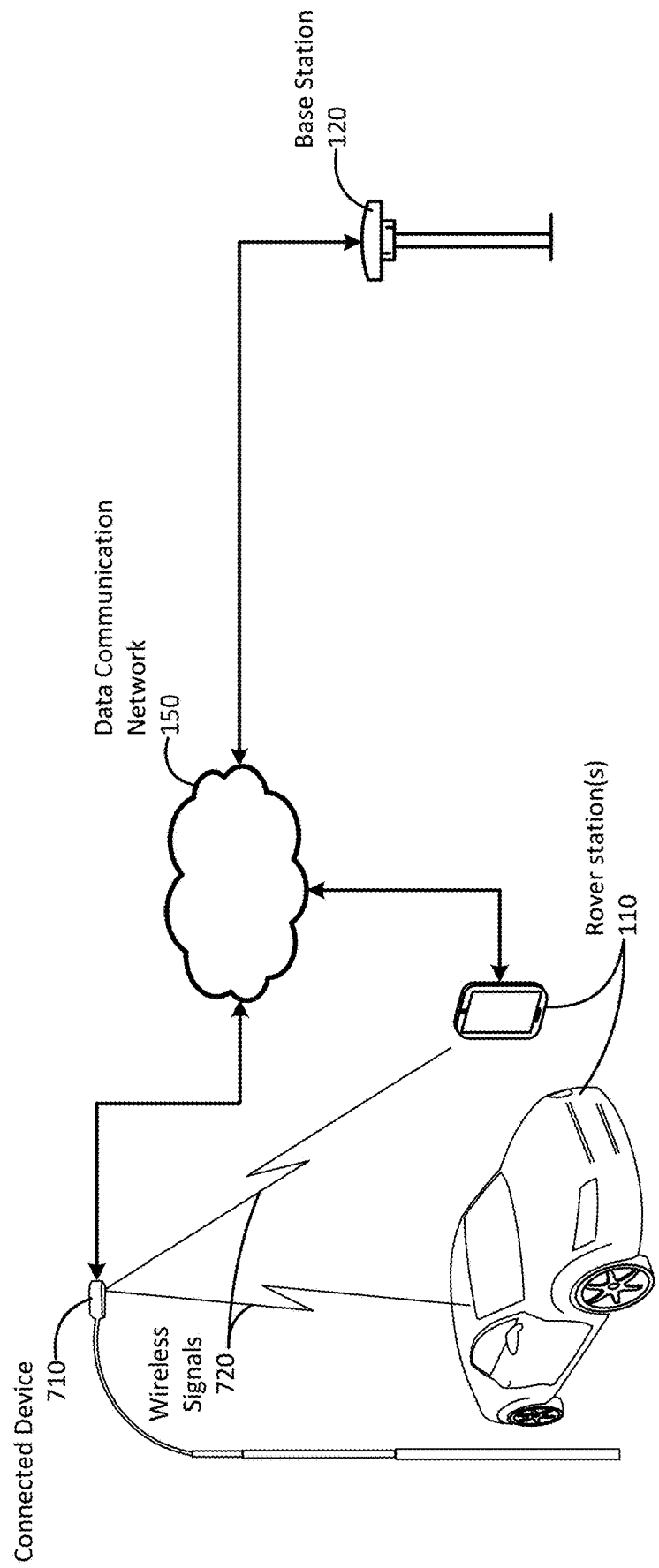
FIG. 7 is a simplified diagram of the various components of an embodiment in which a connected device provides RTK correction information to rover stations 110.

FIG. 7 is a simplified diagram of the various components of an embodiment in which a connected device 710 provides RTK correction information to rover stations 110. It can be noted that, although the connected device 710 is illustrated as a streetlight connected to the data communication network 150, the connected device 710 may comprise and/or be incorporated into any of a variety of types of devices. According to some embodiments, the connected device 710 may comprise an Internet-of-Things (IoT) device, cellular base station (e.g., a next generation Node B (gNB), evolved Node B (eNB), etc.), or the like. As illustrated, the connected device 710 may communicate with multiple nearby rover stations 110.

Here, the connected device 710 may communicate with the rover stations 110 using direct and/or indirect means. For example, the connected device 710 may communicate with rover stations directly utilizing wireless signals 720. These wireless signals may comprise radio frequency (RF), infrared, or other wireless technology, which may utilize any variety of different wireless standards (e.g., Wi-Fi, Bluetooth®, etc.). (In such instances, because the connected device 710 can convey RTK information directly to a rover station 110, the rover station 110 may not need to be communicatively connected with the data communication network 150 to receive RTK correction information.) Indirect means of communication between the connected device 710 and a rover station 110 may comprise communications through the data communication network 150. The connected device 710 (and rover station 110) may be communicatively connected with the data communication network 150 via any of a variety of wireless and/or wired means.

Figure 8:
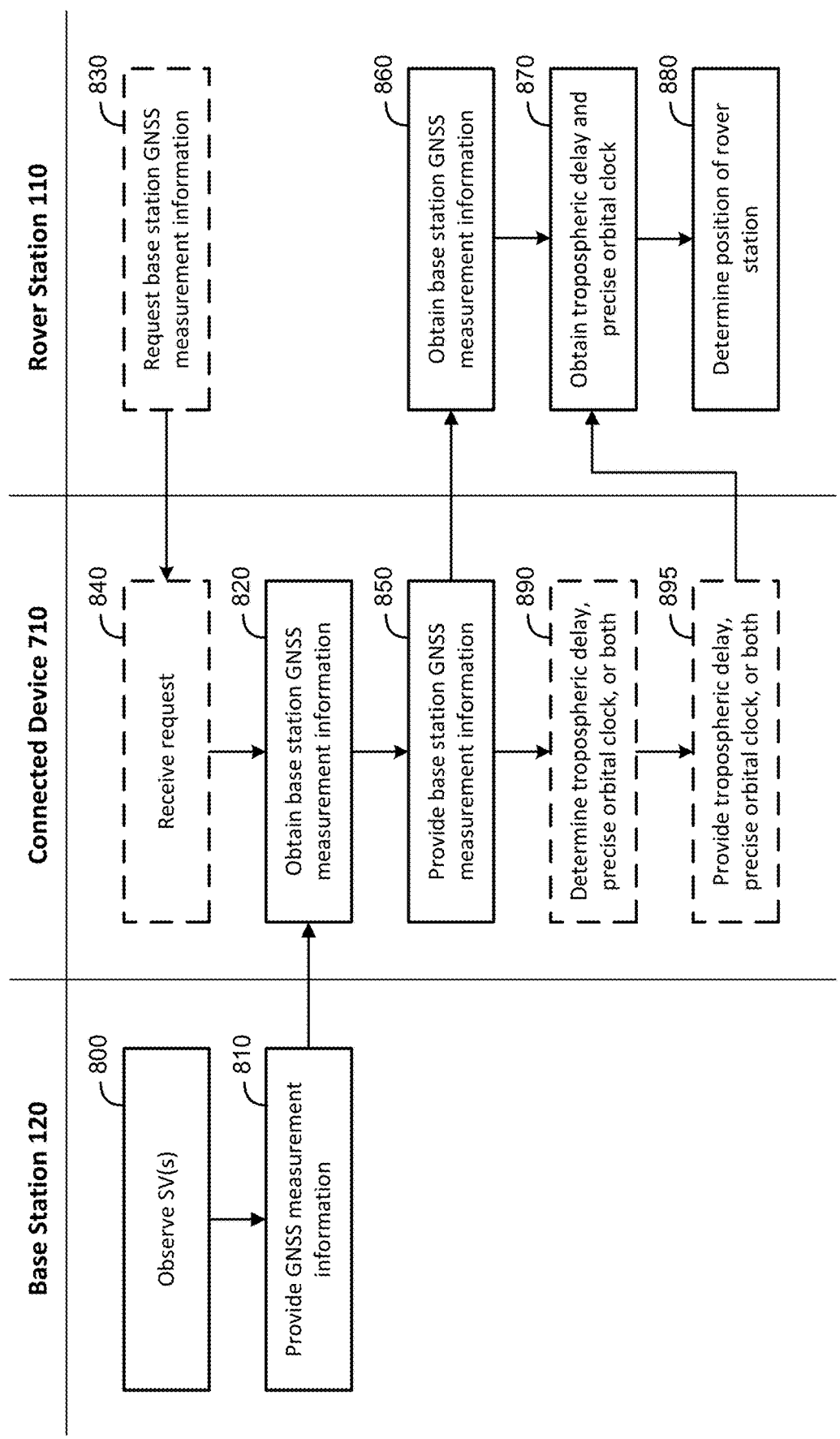
FIG. 8 is a swim-lane diagram illustrating how a base station, connected device, and rover station may communicate in an embodiment in which a connected device is used to provide base station GNSS measurement information.

FIG. 8 is a swim-lane diagram illustrating how a base station 120, connected device 710, and rover station 110 may communicate in embodiments in which a connected device 710 is used to provide base station GNSS measurement information, such as the embodiment of FIG. 7. As a person of ordinary skill the art will appreciate, alternative embodiments may employ the connected device 710 in different ways to utilize information from the base station 120 to provide an RTK solution to the rover station 110. (It can be further noted that, as indicated previously and shown in FIGS. 1 and 4, a connected device 710 may not be used in some embodiments.)

The base station 120 can perform the functionality at blocks 800 and 810 which, similar to blocks 405 and 415 in FIG. 4, comprise obtaining location information from one or more SVs and providing base station GNSS measurement information with regard to each of those SVs to the connected device 710, which obtains the base station GNSS measurement information at block 820.

Depending on desired functionality, the connected device 710 may obtain the base station GNSS measurement information in any of a variety of ways. In some embodiments, for example, the base station 120 may store the base station GNSS measurement information at a unique location on a server or database accessible via the Internet (e.g., via a Uniform Resource Locator (URL). The connected device 710 can then retrieve the base station GNSS measurement information by connecting to the server or database. Additionally or alternatively, the base station 120 may send the base station GNSS measurement information directly to the connected device 710. In some embodiments, the connected device 710 may retrieve the base station GNSS measurement information periodically (e.g., every second), on a scheduled basis, or on an as-needed basis.

As shown by optional blocks 830 and 840 in FIG. 8, one such as-needed basis may comprise a rover station 110 requesting base station GNSS measurement information (at block 830) from the connected device 710, which receives the request at block 840. In such instances, the connected device 710 may retrieve the base station GNSS measurement information and provide the base station GNSS measurement information to the requesting rover station 110 as provided herein below. Additionally or alternatively, the connected device 710 may provide base station GNSS measurement information to the rover station 110 via periodic updates, broadcast, and/or other means.

Once the connected device 710 has the base station GNSS measurement information, it may provide the base station GNSS measurement information (at block 850) to the rover station 110, which obtains the base station GNSS measurement information at block 860. The rover station 110 can further obtain tropospheric delay and precise orbital clock, as shown at block 870, and determine the position of the rover station at block 880, as detailed in the previously-provided embodiments.

As indicated, the connected device 710 may optionally provide the tropospheric delay and/or precise orbital clock, which may result in reduced processing and/or power requirements at the rover station 110. That is, at block 890, the connected device 710 may determine the tropospheric delay (e.g., in the manner described in the previously-detailed embodiments) and/or precise orbital clock. At block 895, the connected device 710 may further provide the tropospheric delay and/or precise orbital clock to the rover station 110. In some embodiments, this information can be provided to a rover station 110 separate from the base station GNSS measurement information. In some embodiments, however, this information may be included with the base station GNSS measurement information. Moreover, similar to the base station GNSS measurement information, some embodiments of a connected device 710 may provide the tropospheric delay and/or precise orbital clock in response to a request received from the rover station 110.

Although not illustrated in FIG. 8, in some embodiments, the connected device 710 itself may determine the position of the rover station 110. That is, the connected device 710 may obtain GNSS measurement data from the rover station 110 and apply the RTK correction (which may account for differences in tropospheric delay between the base station 120 and rover station 110) to get the position of the rover station 110. The connected device 710 may then provide the determined position to the rover station 110 and/or other entity requesting the rover station's position. This can further reduce the processing and power requirements for the rover station 110.

Where the connected device 710 calculates the tropospheric delay, it may do so in any of a variety of ways, depending on desired functionality. For instance, it may gather information about the location of the rover station 110, and calculate the difference in tropospheric delay between the base station 120 and rover station 110 (e.g., using a tropospheric model, as described herein), based on the position of the rover station 110. Alternatively, according to some embodiments, the connected device 710 may assume the rover station 110 is nearby (e.g., within 10-20 km of the connected device 710), and may therefore determine the tropospheric delay between the base station 120 and connected device 710, and provide that delay to the rover station 110. (In such instances, the connected device 710 would not need to know the position of the rover station 110.) In embodiments in which the connected device 710 is communicating directly with the rover station 110 via wireless signals (e.g., wireless signal 720, as shown in FIG. 7), the connected device 710 may assume the rover station 110 is nearby.

Figure 9:
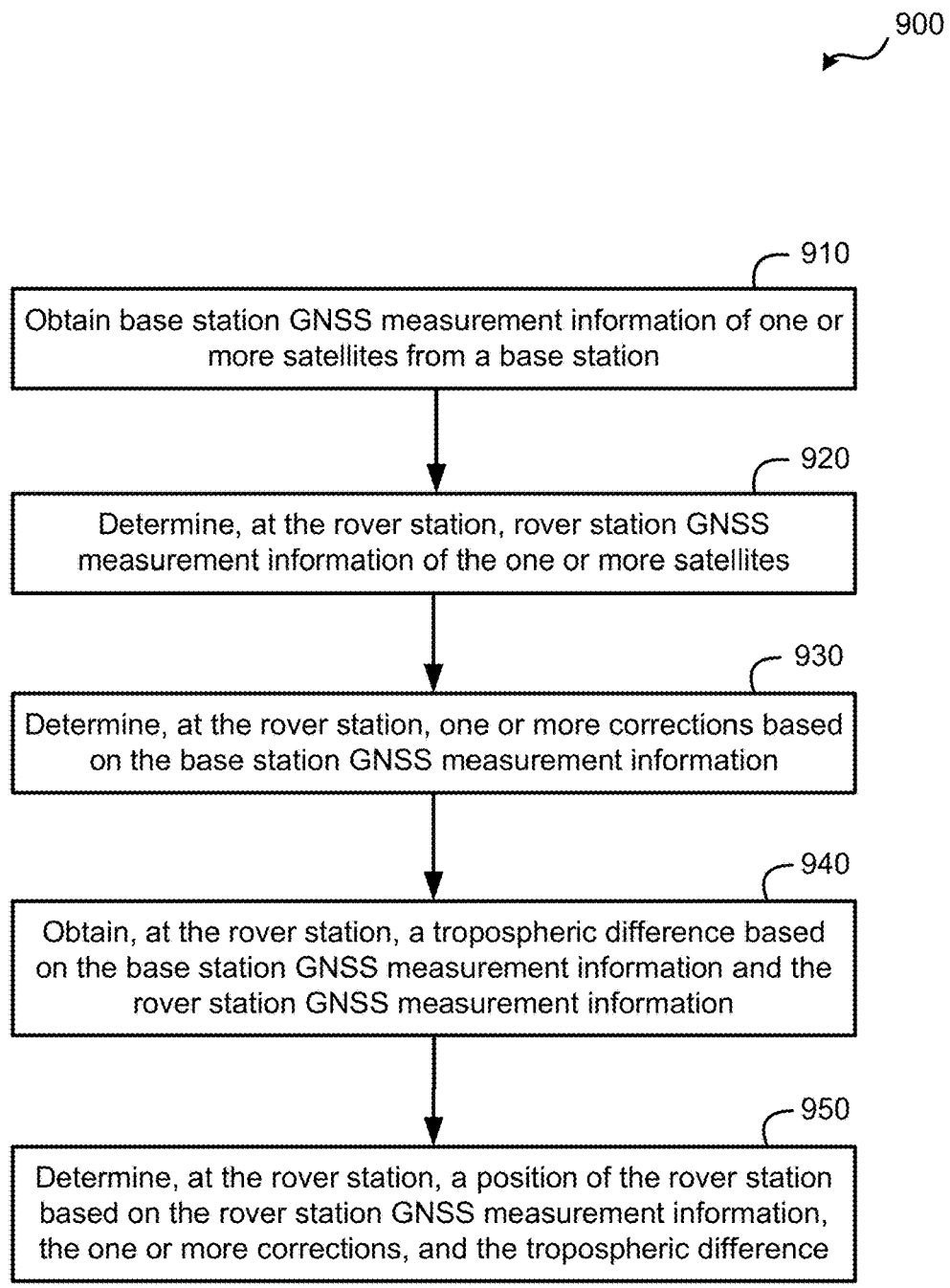
FIG. 9 is a flow diagram of a method of RTK correction in GNSS positioning of the rover station, according to an embodiment.

FIG. 9 is a flow diagram of a method 900 of RTK correction in GNSS positioning of the rover station, according to an embodiment. Alternative embodiments may vary in function by combining, separating, or otherwise varying the functionality described in the blocks illustrated in FIG. 9. The functionality of one or more blocks illustrated in FIG. 9 may be performed by the rover station 110 and/or a connected device 710, as indicated in the previously-described embodiments. As such, means for performing the functionality of one or more of the blocks illustrated in FIG. 9 may comprise hardware and/or software components illustrated in FIGS. 10 and/or 11, which respectively illustrate components of a rover station 110 and connected device 710, and which are discussed in more detail below.

At block 910, base station GNSS measurement information of one or more satellites is obtained from a base station. As noted in the embodiments described above, the base station GNSS measurement information may be obtained by a connected device and/or rover station via a data communication network. According to some embodiments, the base station GNSS measurement information may be obtained as a result of a request sent to the base station by the connected device or rover station. As previously indicated, some embodiments may utilize base station GNSS measurement information from a plurality of base stations. And thus, the base station may be one of many base stations from which base station GNSS information is obtained.

Means for performing the functionality at block 910 may include one or more software and/or hardware components of a rover station 110, such as a bus 1005, processing unit(s) 1010, memory 1060, wireless communication interface 1030, and/or other software and/or hardware components of the rover station 110 illustrated in FIG. 10 and described in more detail below.

Additionally or alternatively, means for performing the functionality at block 910 may include one or more software and/or hardware components of a connected device 710, such as a bus 1105, processing unit(s) 1110, working memory 1135, communications subsystem 1130, and/or other software and/or hardware components of the computer system 1100 illustrated in FIG. 11 which is described in more detail below, and which may be incorporated into a connected device 710.

At block 920 the functionality comprises determining, at the rover station, rover station GNSS measurement information of the one or more satellites. And at block 930, the functionality comprises determining, at the rover station, one or more corrections based on the base station GNSS measurement information. As noted in the process illustrated in FIG. 4 and explained in the previously-described embodiments, RTK corrections can be obtained from differences in the GNSS measurement information between the base station and the rover station, allowing for various errors to be mitigated or canceled Means for performing the functionality at blocks 920 and 930 may include one or more software and/or hardware components of a rover station 110, such as a bus 1005, processing unit(s) 1010, memory 1060, wireless communication interface 1030, and/or other software and/or hardware components of the rover station 110 illustrated in FIG. 10 and described in more detail below.

Additionally or alternatively, means for performing the functionality at blocks 920 and 930 may include one or more software and/or hardware components of a connected device 710, such as a bus 1105, processing unit(s) 1110, working memory 1135, communications subsystem 1130, and/or other software and/or hardware components of the computer system 1100 illustrated in FIG. 11, described in more detail below.

The functionality at 940 comprises obtaining, at the rover station, a tropospheric difference based on the base station GNSS measurement information and the rover station GNSS measurement. This tropospheric difference can be determined from delays in the GNSS measurements. More specifically, as previously noted, determining the tropospheric difference may comprise applying a tropospheric model to a line-of-sight path of RF signals from the one or more satellites to a base station to determine a first tropospheric delay, further applying a tropospheric model to a line-of-sight path of RF signals from the satellite to the rover station to determine a second tropospheric delay, and determining a difference between the first tropospheric delay and the second tropospheric delay. As previously noted, depending on desired functionality, any of a variety of tropospheric models may be used to determine the tropospheric delays, including Hopfield, RTCA, Saastamoinen, and the like. As illustrated in equation (3) above, the tropospheric difference may be included with other error correction, depending on desired functionality. Additionally or alternatively, as illustrated in FIGS. 4 and 8, tropospheric difference may be determined and/or used separate from other error correction (e.g., RTK correction).

As noted in FIG. 8, some embodiments may comprise determining the tropospheric difference at a connected device, which can then provide the tropospheric difference to the rover station.

Means for performing the functionality at block 940 may include one or more software and/or hardware components of a rover station 110, such as a bus 1005, processing unit(s) 1010, memory 1060, and/or other software and/or hardware components of the rover station 110 illustrated in FIG. 10 and described in more detail below.

Additionally or alternatively, means for performing the functionality at block 910 may include one or more software and/or hardware components of a connected device 710, such as a bus 1105, processing unit(s) 1110, working memory 1135, and/or other software and/or hardware components of the computer system 1100 illustrated in FIG. 11, described in more detail below.

The functionality at block 950 comprises determining, at the rover station, a position of the rover station based on the rover station GNSS measurement information, the one or more corrections, and the tropospheric difference. More specifically, by applying the one or more corrections and the tropospheric difference to the rover station GNSS measurement information (e.g., in the manner shown in equation (3)) a highly-accurate position of the rover station can be determined.

Means for performing the functionality at block 950 may include one or more software and/or hardware components of a rover station 110, such as a bus 1005, processing unit(s) 1010, memory 1060, and/or other software and/or hardware components of the rover station 110 illustrated in FIG. 10 and described in more detail below.

Additionally or alternatively, means for performing the functionality at block 950 may include one or more software and/or hardware components of a connected device 710, such as a bus 1105, processing unit(s) 1110, working memory 1135, and/or other software and/or hardware components of the computer system 1100 illustrated in FIG. 11, described in more detail below.

As indicated in the previously-described embodiments, the method 900 may include any of a variety of additional features, depending on desired functionality. For example, as discussed in regard to FIGS. 3-4, embodiments may further utilize a correction service (e.g., SBAS and/or WAAS) to provide correction of satellite information if no RTK correction information is available (e.g., where a satellite is observed by the rover station, but not by the base station). Alternative embodiments of the method 900 may therefore further comprise receiving, at the rover station, additional rover station GNSS measurement information of one or more additional satellites for which base station GNSS measurement information is not obtained, and correcting the additional rover station GNSS measurement information by performing orbital clock corrections on the additional RF signals using information from a correction service. In such embodiments, determining the position of the rover station is additionally based on the corrected additional rover station GNSS measurement information, which can be used in conjunction with RTK-corrected rover station GNSS measurement information to determine an ultimate position of the rover station. Tropospheric delay can be applied to this corrected additional rover station GNSS measurement information as well, according to some embodiments. Thus, alternative embodiments of the method 900 may further comprise determining a tropospheric delay of the additional rover station GNSS measurement information by applying a tropospheric model to a line of sight path of the additional RF signals from the one or more additional satellites to the rover station, where the determining the position of the rover station is additionally based on the tropospheric delay of the RF signals.

Additionally, as noted in the embodiments described earlier, embodiments may determine corrections by estimating receiver clock and inter-signal biases. This can further allow embodiments to sidestep the need to perform a DD calculation using a reference satellite. As such, according to some embodiments, the determining the location of the rover station 110 may further comprise estimating receiver clock and inter-signal biases, wherein the determining the position of the rover station 110 is additionally based on the estimated receiver clock and inter-signal biases, and the determining the position of the rover station is performed without calculating a DD between a value related to the satellite and a corresponding value related to a reference satellite.

Because aspects of the method 900 may be performed by a connected device 710, alternative embodiments to the method 900 may include functionality specific to a connected device. That is, according to some embodiments, the method 900 may further comprise performing, with a connected device 710 comprising a device communicatively connected with a data communication network 150, the functions of receiving the base station GNSS measurement information from the base station 120 via the data communication network 150, determining the tropospheric difference, and providing the base station GNSS measurement information and the tropospheric difference to the rover station 110. As noted, in some embodiments, that a connected device 710 may provide the they station GNSS measurement information, the tropospheric difference, or both to the rover station 110 via wireless signals (e.g., via a direct wireless communication link). In some embodiments, the connected device 710 may further provide the base station GNSS measurement information, the tropospheric difference, or both in response to a request from the rover station 110. As further indicated in FIG. 8, in some embodiments the connected device 710 may further provide precise orbital clock information to the rover station 110. According to some embodiments, determining the tropospheric difference comprises determining a difference in a troposphere wet zenith delay residual in the base station GNSS measurement information and a troposphere wet zenith delay residual in the rover station GNSS measurement information.

Figure 10:
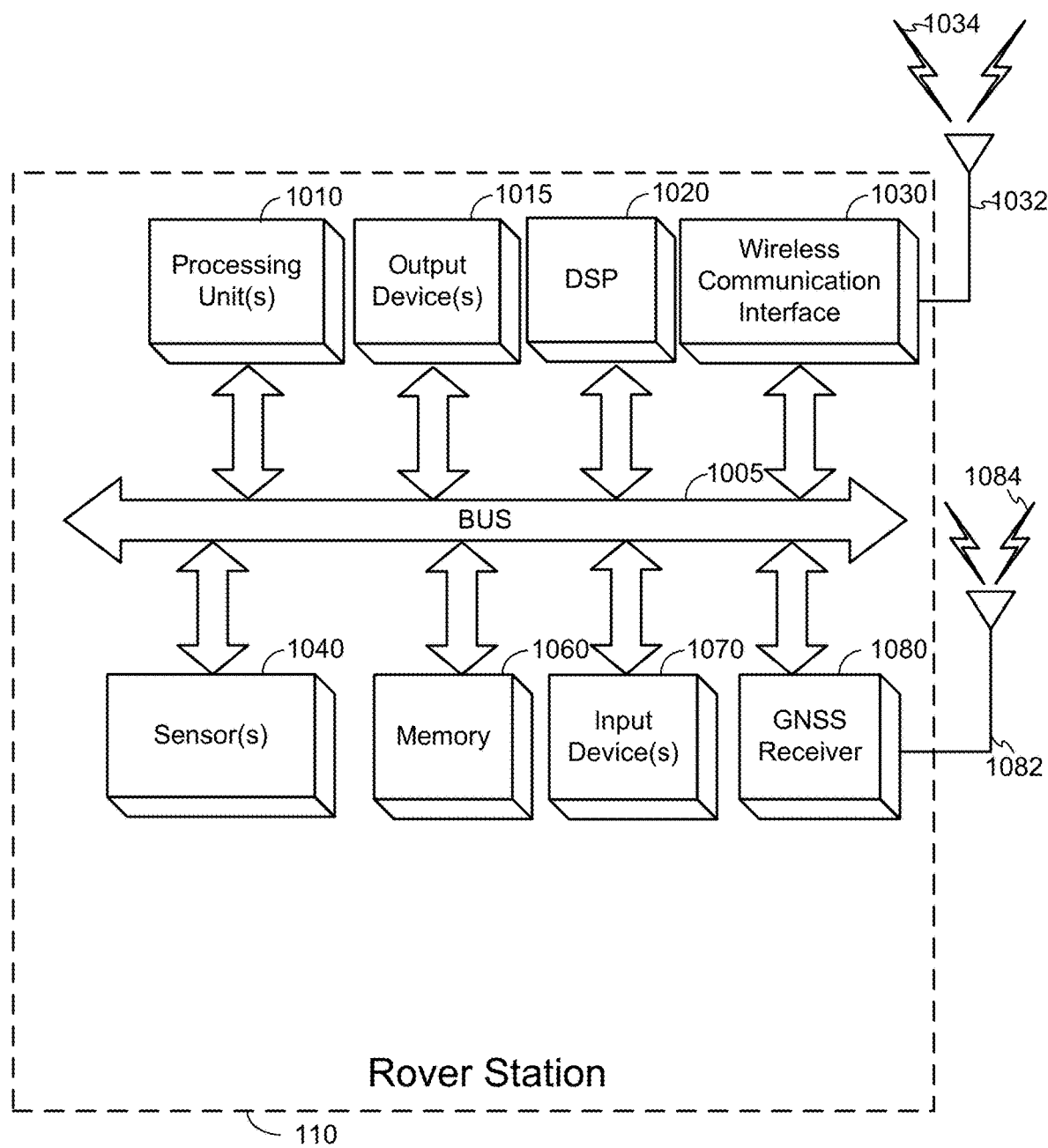
FIG. 10 is a block diagram of an embodiment of a rover station.

FIG. 10 is a block diagram of various hardware and software components of a rover station 110, according to an embodiment. These components can be utilized as described herein above (e.g. in association with FIGS. 1-9). For example, the rover station 110 can perform the actions of the rover station 110 illustrated in FIGS. 4 and 8, and/or one or more of the functions of the method 900 illustrated in FIG. 9. It should be noted that FIG. 10 is meant only to provide a generalized illustration of various components, any or all of which may be utilized as appropriate. As previously noted, rover stations 110 may vary in form and function, and may ultimately comprise any GNSS-enabled device, including vehicles, commercial and consumer electronic devices, survey equipment, and more. Thus, in some instances, components illustrated by FIG. 10 can be localized to a single physical device and/or distributed among various networked devices, which may be disposed at different physical locations (e.g., different locations of a vehicle).

The rover station 110 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration units (GPUs), application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below). The rover station 110 also can include one or more input devices 1070, which can include without limitation a keyboard, touch screen, a touch pad, microphone, button(s), dial(s), switch(es), and/or the like; and one or more output devices 1015, which can include without limitation a display, light emitting diode (LED), speakers, and/or the like. As will be appreciated, the type of input devices 1070 and output devices 1015 may depend on the type of rover station 110 with which the input devices 1070 and output devices 1015 are integrated.

The rover station 110 may also include a wireless communication interface 1030, which may comprise without limitation a modem, a network card, an infrared communication device, a wireless communication device, and/or a chipset (such as a Bluetooth®® device, an IEEE 802.11 device, an IEEE 802.15.4 device, a Wi-Fi device, a WiMAX™ device, a WAN device and/or various cellular devices, etc.), and/or the like, which may enable the rover station 110 to communicate via the networks described above with regard to FIG. 1. The wireless communication interface 1030 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 1032 that send and/or receive wireless signals 1034.

Depending on desired functionality, the wireless communication interface 1030 may comprise separate transceivers to communicate with base stations and other terrestrial transceivers, such as wireless devices and access points. The rover station 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE™, LTE™ Advanced, 5G NR, and so on. 5G NR, Long-Term Evolution (LTE™), LTE Advanced, GSM, and WCDMA are described in documents from the Third Generation Partnership Project (3GPP™). Cdma2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The rover station 110 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the rover station 110 may also include a GNSS receiver 1080 capable of receiving signals 1084 from one or more GNSS satellites (e.g., SVs 140) as described herein using an antenna 1082 (which could be the same as antenna 1032). The GNSS receiver 1080 can extract a position of the rover station 110, using conventional techniques, from GNSS SVs of a GNSS system (e.g., SVs 140 of FIG. 1), such as GPS, GAL, Glonass, Quasi-Zenith Satellite System (QZSS) over Japan, Indian Regional Navigational Satellite System (IRNSS) over India, Beidou over China, and/or the like. Moreover, the GNSS receiver 1080 can be used with various augmentation systems (e.g., SBAS) that may be associated with or otherwise enabled for use with one or more global and/or regional navigation satellite systems, such as, e.g., WAAS, European Geostationary Navigation Overlay Service (EGNOS), Multi-functional Satellite Augmentation System (MSAS), and Geo Augmented Navigation system (GAGAN), and/or the like.

The rover station 110 may further include and/or be in communication with a memory 1060. The memory 1060 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the rover station 110 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the rover station 110 (and/or processing unit(s) 1010 or DSP 1020 within rover station 110). In an aspect, then, such code and/or instructions can be used to configure and/or adapt a general purpose computer (or other device) to perform one or more operations in accordance with the described methods.

Figure 11:
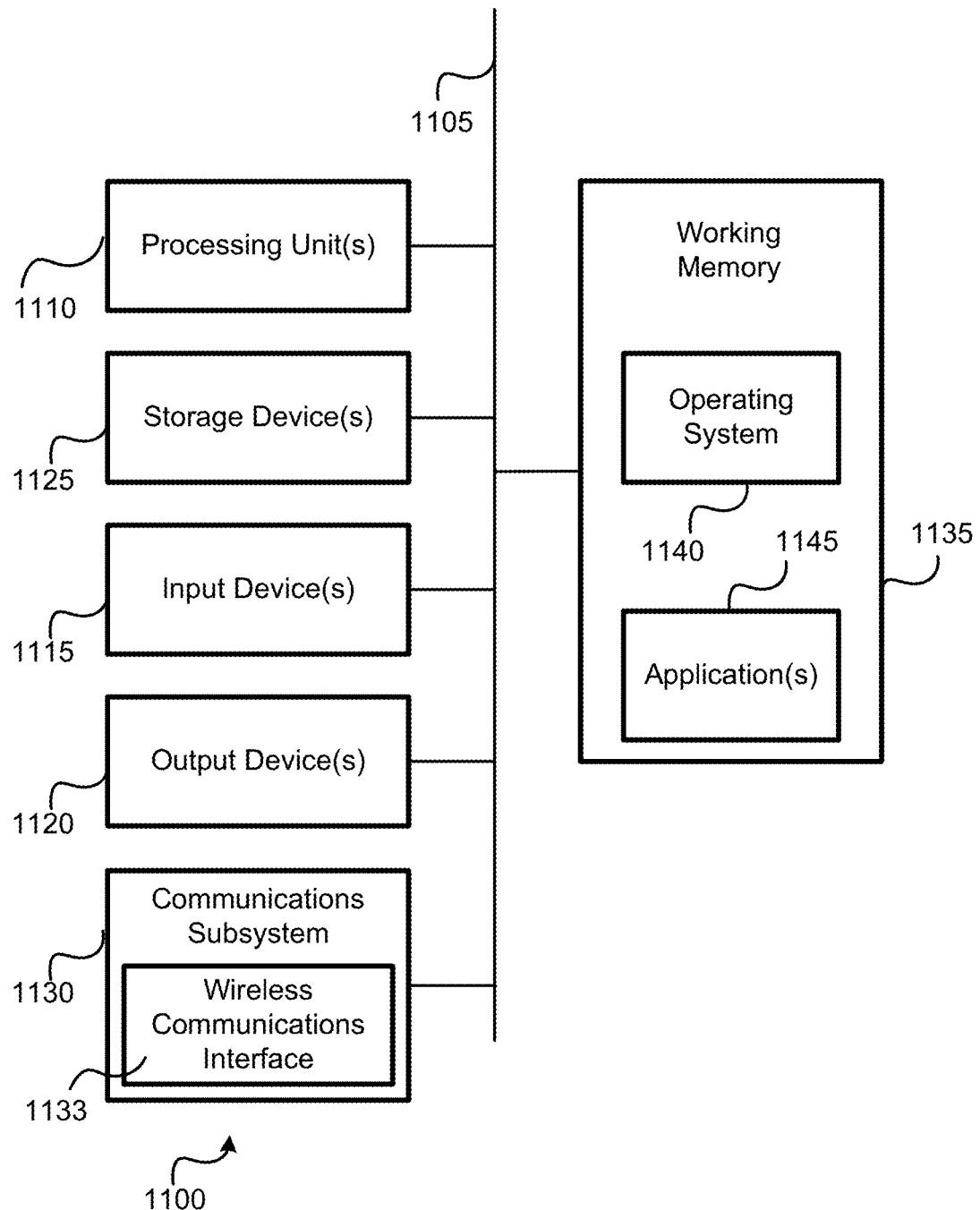
FIG. 11 provides a schematic illustration of one embodiment of a computer system that can perform the methods provided by various other embodiments.

FIG. 11 illustrates an embodiment of a computer system 1100, which may be utilized and/or incorporated into a base station 120, connected device 710 and/or other devices described herein. FIG. 11 provides a schematic illustration of one embodiment of a computer system 1100 that can perform the methods provided by various other embodiments, such as the methods described in relation to FIGS. 1-9. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, as with the components of FIG. 10, components illustrated by FIG. 11 can be localized to a single device and/or distributed among various networked devices, which may be disposed at different physical or geographical locations.

The computer system 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as DSPs, ASICs, GPUs, and/or the like), and/or other processing structure, which can be configured to perform one or more of the methods described herein, including the method described in relation to FIG. 9. The computer system 1100 also can include one or more input devices 1115, which can include without limitation a mouse, a keyboard, a camera, a microphone, and/or the like; and one or more output devices 1120, which can include without limitation a display device, a printer, and/or the like. Again, the type of input devices 1115 and output devices 1120 may depend on the type computer system 1100 with which the input devices 1070 and output devices 1015 are integrated.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a RAM, and/or ROM, which can be programmable, flash-updateable, and/or the like. Such storage devices may be configured to implement any appropriate data stores, including without limitation, various file systems, database structures, and/or the like.

The computer system 1100 may also include a communications subsystem 1130, which can include support of wireline communication technologies and/or wireless communication technologies (in some embodiments) managed and controlled by a wireless communication interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data and signaling to be exchanged with a network, mobile devices, other computer systems, and/or any other electronic devices described herein. Specifically, where the computer system 1100 comprises a connected device 710, the wireless communication interface 1133 can allow the connected device 710 to communicate with one or more rover stations 110 via wireless signals 720 (as illustrated in FIG. 7).

In many embodiments, the computer system 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 9, may be implemented as code and/or instructions that are stored (e.g. temporarily) in working memory 1135 and are executable by a computer (and/or a processing unit within a computer such as processing unit(s) 1110); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method, by a rover station or connected device, of Real-Time Kinematic (RTK) correction in Global Navigation Satellite System (GNSS) positioning of the rover station, the method comprising:
   obtaining base station GNSS measurement information of one or more satellites from a base station;
   determining, at the rover station, rover station GNSS measurement information of the one or more satellites, wherein ionosphere errors in the rover station GNSS measurement information of the one or more satellites are reduced based on measurements of RF signals transmitted by the one or more satellite on different frequencies;
   determining, at the rover station, one or more corrections based on the base station GNSS measurement information;
   obtaining, at the rover station, a tropospheric difference based on the base station GNSS measurement information and the rover station GNSS measurement information; and
   determining, at the rover station, a position of the rover station based on the rover station GNSS measurement information, the one or more corrections, and the tropospheric difference.

2. The method of claim 1, wherein determining the tropospheric difference based on the GNSS measurement information and the rover station GNSS measurement information comprises:
   applying a tropospheric model to a line-of-sight path of radio frequency (RF) signals from the one or more satellites to the base station to determine a first tropospheric delay in the base station GNSS measurement information; and
   applying the tropospheric model to a line-of-sight path of RF signals from the satellite to the rover station to determine a second tropospheric delay in the rover station GNSS measurement information.

3. The method of claim 1, further comprising:
   receiving, at the rover station, additional rover station GNSS measurement information of one or more additional satellites for which base station GNSS measurement information is not obtained; and
   correcting the additional rover station GNSS measurement information by performing orbital clock corrections on the additional rover station GNSS measurement information using information from a correction service; and
   wherein the determining the position of the rover station is additionally based on the corrected additional rover station GNSS measurement information.

4. The method of claim 3, further comprising determining a tropospheric delay of the additional rover station GNSS measurement information by applying a tropospheric model to a line-of-sight path of RF signals from the one or more additional satellites to the rover station; and wherein the determining the position of the rover station is additionally based on the tropospheric delay of the RF signals.

5. The method of claim 1, wherein the determining the position of the rover station further comprises estimating receiver clock and inter-signal biases, wherein:
   the determining the position of the rover station is additionally based on the estimated the receiver clock and inter-signal biases; and the determining the position of the rover station is performed without calculating a double difference (DD) between a value related to the satellite and a corresponding value related to a reference satellite.

6. The method of claim 1, wherein a connected device comprising a device communicatively connected with a data communication network:
   receives the base station GNSS measurement information from the base station via the data communication network;
   determines the tropospheric difference; and
   provides the base station GNSS measurement information and the tropospheric difference to the rover station.

7. The method of claim 6, wherein the connected device provides the base station GNSS measurement information, the tropospheric difference, or both, to the rover station via wireless signals or via the data communication network.

8. The method of claim 6, wherein the connected device provides the base station GNSS measurement information, the tropospheric difference, or both, in response to a request from the rover station received via wireless signals or via the data communication network.

9. The method of claim 6, wherein the connected device further provides precise orbital clock information to the rover station via wireless signals or via the data communication network.

10. The method of claim 1, wherein determining the tropospheric difference comprises determining a difference in a troposphere wet zenith delay residual in the base station GNSS measurement information and a troposphere wet zenith delay residual in the rover station GNSS measurement information.

11. A rover station comprising:
    a transceiver
    a memory; and
    one or more processing units communicatively coupled with the memory and configured to:
      obtain, via the transceiver, base station GNSS measurement information of one or more satellites from a base station;
      determine rover station GNSS measurement information of the one or more satellites, wherein ionosphere errors in the rover station GNSS measurement information of the one or more satellites are reduced based on measurements of RF signals transmitted by the one or more satellite on different frequencies;
      determine one or more corrections based on the base station GNSS measurement information;
      obtain a tropospheric difference based on the base station GNSS measurement information and the rover station GNSS measurement information; and
      determine a position of the rover station based on the rover station GNSS measurement information, the one or more corrections, and the tropospheric difference.

12. The rover station of claim 11, wherein, to determine the tropospheric difference based on the GNSS measurement information and the rover station GNSS measurement information, the one or more processing units are configured to:
    apply a tropospheric model to a line-of-sight path of radio frequency (RF) signals from the one or more satellites to the base station to determine a first tropospheric delay in the base station GNSS measurement information; and
    apply the tropospheric model to a line-of-sight path of RF signals from the one or more satellites to a rover station to determine a second tropospheric delay in the rover station GNSS measurement information.

13. The rover station of claim 11, further comprising a Global Navigation Satellite System (GNSS) receiver, wherein the one or more processing units are further configured to:
    receive, via the GNSS receiver, additional rover station GNSS measurement information of one or more additional satellites for which base station GNSS measurement information is not obtained; and
    correct the additional rover station GNSS measurement information by performing orbital clock corrections on the additional rover station GNSS measurement information using information from a correction service; and
    wherein the one or more processing units are configured to determine the position of the rover station additionally based on the corrected additional rover station GNSS measurement information.

14. The rover station claim 13, wherein the one or more processing units are further configured to determine a tropospheric delay of the additional rover station GNSS measurement information by applying a tropospheric model to a line-of-sight path of RF signals from the one or more additional satellites to the rover station; and wherein the one or more processing units are further configured to determine the position of the rover station additionally based on the tropospheric delay of the RF signals.

15. The rover station of claim 11, wherein, to determine the position of the rover station, the one or more processing units are further configured to estimate receiver clock and inter-signal biases, wherein:
    the one or more processing units are configured to determine the position of the rover station additionally based on the estimated the receiver clock and inter-signal biases; and
    the one or more processing units are configured to perform the determining of the position of the rover station without calculating a double difference (DD) between a value related to the satellite and a corresponding value related to a reference satellite.

16. The rover station of claim 11, wherein the one or more processing units are further configured to:
    obtain the base station GNSS measurement information and the tropospheric difference from a connected device.

17. The rover station of claim 16, further comprising a wireless communication interface, wherein the one or more processing units are further configured to obtain the base station GNSS measurement information, the tropospheric difference, or both, via the wireless communication interface.

18. The rover station of claim 16, wherein the one or more processing units are further configured to obtain the base station GNSS measurement information, the tropospheric difference, or both, via wireless signals transmitted by the connected device or via a data communication network, in response to a request from the rover station.

19. The rover station of claim 16, wherein the one or more processing units are further configured to obtain precise orbital clock information from a connected device via wireless signals transmitted by the connected device or via a data communication network.

20. A device for providing Real-Time Kinematic (RTK) correction in GNSS positioning of a rover station, the device comprising:

means for obtaining base station GNSS measurement information of one or more satellites from a base station;

means for determining, at the rover station, rover station GNSS measurement information of the one or more satellites;

means for determining, at the rover station, one or more corrections based on the base station GNSS measurement information, wherein ionosphere errors in the rover station GNSS measurement information of the one or more satellites are reduced based on measurements of RF signals transmitted by the one or more satellite on different frequencies;

means for obtaining, at the rover station, a tropospheric difference based on the base station GNSS measurement information and the rover station GNSS measurement information; and means for determining, at the rover station, a position of the rover station based on the rover station GNSS measurement information, the one or more corrections, and the tropospheric difference.

21. The device of claim 20, wherein the means for determining the tropospheric difference based on the GNSS measurement information and the rover station GNSS measurement information comprises:

means for applying a tropospheric model to a line-of-sight path of radio frequency (RF) signals from the one or more satellites to the base station to determine a first tropospheric delay in the base station GNSS measurement information; and means for applying the tropospheric model to a line-of-sight path of RF signals from the satellite to the rover station to determine a second tropospheric delay in the rover station GNSS measurement information.

22. The device of claim 20, further comprising:

means for receiving additional rover station GNSS measurement information of one or more additional satellites for which base station GNSS measurement information is not obtained; and means for correcting the additional rover station GNSS measurement information by performing orbital clock corrections on the additional rover station GNSS measurement information using information from a correction service; and wherein the means for determining the position of the rover station are configured to additionally base the determining the position of the rover station on the corrected additional rover station GNSS measurement information.

23. The device of claim 22, further comprising means for determining a tropospheric delay of the additional rover station GNSS measurement information by applying a tropospheric model to a line-of-sight path of RF signals from the one or more additional satellites to the rover station; and wherein the means for determining the position of the rover station are configured to additionally base the determining the position of the rover station on the tropospheric delay of the RF signals.

24. The device of claim 20, wherein the means for determining the position of the rover station further comprising means for estimating receiver clock and inter-signal biases, wherein the means for determining the position of the rover station are configured to:

additionally base the determining the position of the rover station on the estimated the receiver clock and inter-signal biases; and perform the determining the position of the rover station without calculating a double difference (DD) between a value related to the satellite and a corresponding value related to a reference satellite.

25. The device of claim 20, further comprising:

means for obtaining the base station GNSS measurement information and the tropospheric difference from a connected device.

26. The device of claim 25, further comprising means for obtaining the base station GNSS measurement information, the tropospheric difference, or both, via wireless signals transmitted by the connected device or via a data communication network.

27. The device of claim 25, further comprising means for obtaining precise orbital clock information from a connected device via wireless signals transmitted by the connected device or via a data communication network.

28. A non-transitory computer-readable medium having instructions stored there with four Real-Time Kinematic (RTK) correction in GNSS positioning of a rover station, wherein the instructions, when executed by one or more processing units, cause the one or more processing units to:

obtain base station GNSS measurement information of one or more satellites from a base station;

determine rover station GNSS measurement information of the one or more satellites, wherein ionosphere errors in the rover station GNSS measurement information of the one or more satellites are reduced based on measurements of RF signals transmitted by the one or more satellite on different frequencies;

determine one or more corrections based on the base station GNSS measurement information;

obtain a tropospheric difference based on the base station GNSS measurement information and the rover station GNSS measurement information; and determine a position of the rover station based on the rover station GNSS measurement information, the one or more corrections, and the tropospheric difference.

29. The non-transitory computer-readable medium of claim 28, wherein, to determine the tropospheric difference based on the GNSS measurement information and the rover station GNSS measurement information, the instructions, when executed by one or more processing units, cause the one or more processing units to:

apply a tropospheric model to a line-of-sight path of radio frequency (RF) signals from the one or more satellites to the base station to determine a first tropospheric delay in the base station GNSS measurement information; and apply the tropospheric model to a line-of-sight path of RF signals from the satellite to the rover station to determine a second tropospheric delay in the rover station GNSS measurement information.

30. The non-transitory computer-readable medium of claim 28, wherein the instructions, when executed by one or more processing units, cause the one or more processing units to:

receive additional rover station GNSS measurement information of one or more additional satellites for which base station GNSS measurement information is not obtained; and correct the additional rover station GNSS measurement information by performing orbital clock corrections on the additional rover station GNSS measurement information using information from a correction service; and wherein the instructions are configured to cause the one or more processing units to determine the position of the rover station additionally based on the corrected additional rover station GNSS measurement information.

* * * * *